United States Patent [19]

Blomstrand et al.

[11] Patent Number: 4,749,547
[45] Date of Patent: Jun. 7, 1988

[54] NUCLEAR FUEL ASSEMBLY

[75] Inventors: Jan Blomstrand; Sigvard Junkrans; Olov Nylund, Västerås, all of Sweden

[73] Assignee: Aktiebolaget ASEA-ATOM, Västerås, Sweden

[21] Appl. No.: 914,444

[22] Filed: Oct. 1, 1986

[30] Foreign Application Priority Data

Oct. 16, 1985 [SE] Sweden ............................ 8504811

[51] Int. Cl.⁴ ............................................. G21C 3/32
[52] U.S. Cl. ..................................... 376/444; 376/900
[58] Field of Search ............. 376/438, 439, 444, 445, 376/424, 416, 409, 900; 228/173.2, 131

[56] References Cited

U.S. PATENT DOCUMENTS

| | | | |
|---|---|---|---|
| 4,478,786 | 10/1984 | Andersson et al. | 376/444 |
| 4,567,017 | 1/1986 | Vaidyanathan | 376/416 |
| 4,573,629 | 3/1986 | Imahashi | 228/173.2 |
| 4,588,550 | 5/1986 | Blomstrand et al. | 376/438 |
| 4,613,479 | 9/1986 | Foster | 376/416 |

Primary Examiner—Donald P. Walsh
Attorney, Agent, or Firm—Watson, Cole, Grindle & Watson

[57] ABSTRACT

A nuclear fuel assembly containing a plurality of vertical fuel rods and possibly occasional vertical water-filled rods, which are surrounded by a fuel channel of substantially square cross-section and which are divided, by means of a vertical channel for water of substantially cruciform cross-section, into four sub-bundles. Each fuel rod contains a stack of circular-cylindrical pellets of a nuclear fuel arranged in a cladding tube. Each sub-bundle consists of, in all, twenty-five rods arranged in a lattice containing 5×5 rods. The cladding tube of each fuel rod has a wall thickness in the range 0.50 to 0.70 mm and an external diameter in the range 8.5 to 10.3 mm.

15 Claims, 3 Drawing Sheets

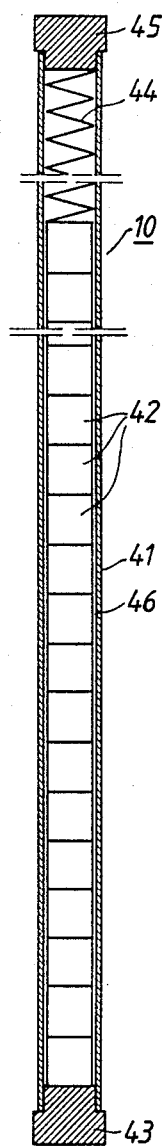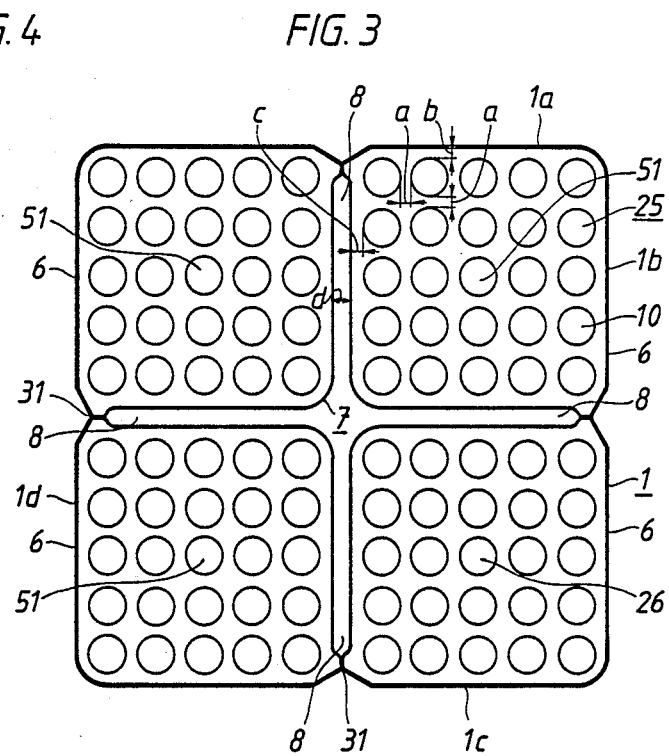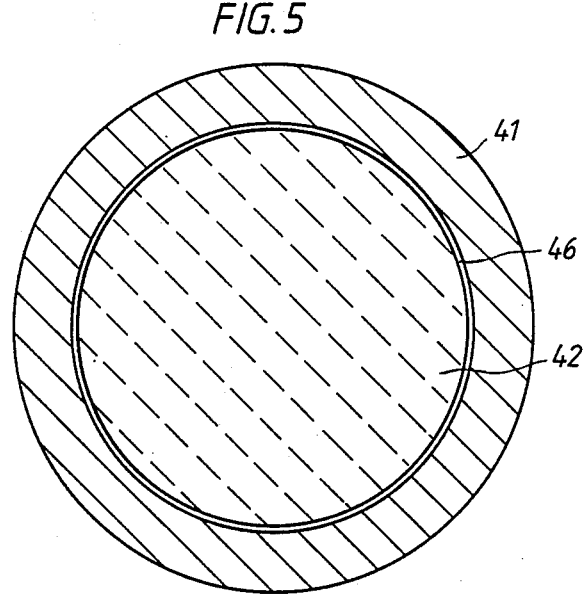

NUCLEAR FUEL ASSEMBLY

TECHNICAL FIELD

The present invention relates to a nuclear fuel assembly for use in boiling water reactors comprising a plurality of vertical fuel rods, and possibly occasional vertical water-filled rods, which are surrounded by a fuel channel of substantially square cross-section and which are divided, by means of a vertical channel for water of substantially cruciform cross-section, into four sub-bundles, whereby each fuel rod contains a stack, arranged in a cladding tube, of nuclear fuel pellets.

DISCUSSION OF PRIOR ART

Fuel assemblies of the above kind are known see for example, U.S. Pat. No. 4,478,786 and U.S. patent application Ser. No. 295,984, filed on Aug. 25, 1981, in the names of Nylund and Schölin. These known fuel assemblies are made with sixty-four fuel rods per assembly and the rods are divided into four sub-bundles, each one containing 4×4 fuel rods. In supplied fuel assemblies of this known kind, the cladding tubes of the fuel rods have a maximum external diameter of 12.25 mm and a minimum external diameter of 11.63 mm and a wall thickness within the range 0.74 to 0.8 mm. Each fuel pellet in the fuel rods has a diameter within the range 9.94 to 10.44 mm and its diameter is about 0.2 mm smaller than the internal diameter of the cladding tube. The distance between the envelope surfaces of two adjacent fuel rods, arranged in the same row, in each sub-bundle is between 3.55 and 3.87 mm. The width of that part of the channel for water which is located between two adjacently positioned subbundles is, in the known fuel assemblies, at the most 5.8 mm and at the least 4 mm.

U.S. Pat. No. 4,588,550 to Blomstrand et al. proposes the use of a larger number of fuel rods than 4×4 in each sub-bundle while maintaining the external dimensions of the fuel assembly in order thus to reduce the linear load on each fuel rod, that is, the power per unit of length of the fuel rod, and hence the risk of the cladding tube being damaged by stresses arising during operation of the reactor. Blomstrand et al. recommend the use of about 80 fuel rods in the fuel assembly and describe various geometries for positioning the fuel rods in the fuel assembly and its sub-bundles. Among other things, fuel assemblies are shown in which a sub-bundle containing 5×5 fuel rods is included. It is also stated in the Blomstrand et al. patent that it is not considered advantageous to increase the number of fuel assemblies to such an extent that the total number of fuel rods in the assembly becomes 100 (i.e. four sub-bundles each containing 5×5 rods) in place of 64. The difficulties which exist when using as many as 100 fuel rods in the assembly consist in achieving an acceptable reactivity without the pressure drop in the assembly becoming too great.

SUMMARY OF THE INVENTION

According to the present invention it has proved to be possible to overcome the difficulties by designing the cladding tubes of the fuel rods with a wall thickness which lies in the range 0.5 to 0.7 mm and with an external diameter in the range of 8.5 to 10.3 mm. By these measures, it is possible to incorporate a quantity of fuel in the fuel rods which is necessary for obtaining an acceptable nuclear reactivity while at the same time achieving a flow area in the fuel assembly which is necessary for obtaining an acceptable pressure drop. The fact that it is possible in this way to reduce the thickness of the cladding tube has to do with the fact that is had proved to be possible to reduce the gas pressure in the fuel rod to less than that in the previously supplied assemblies because of the fact that emission of fission gases from the fuel pellets can be suppressed as a consequence of maintaining the fuel at a lower temperature.

The fuel pellets in each fuel rod preferably have a diameter in the range of 7.4 to 8.8 mm. This diameter is preferably 0.14 to 0.2 mm smaller than the internal diameter of the cladding tubes. The distance between the envelope surfaces of two fuel rods located in the same row of vertical rods in a sub-bundle preferably amounts to 2.4 to 3.9 mm and the distance between a fuel rod located adjacent to a side wall in the fuel channel and the side wall as well as the distance between a fuel rod located adjacent to a wall in the cruciform channel for water and the wall in the channel preferably amount to 2.0 to 4.0 mm. The width of that part of the channel for water which is located between two adjoining sub-bundles is preferably 3.0 to 8.0 mm. In certain cases a width of 6.0 to 8.0 mm is preferable. The vertical distance between the rod spaced mounted in a subbundle may advantageously amount to 400 to 600 mm.

In a fuel assembly according to the present invention, a low internal form factor is attained because of the existence of the water channel with the cruciform cross-section. The invention thus permits the use of a greater axial form factor, which can be utilized for fuel saving by arranging pellets of oxide of natural uranium at both ends of each fuel rod.

According to an advantageous embodiment of the invention, the center rod in each sub-bundle containing 5×5 rods is used as a tie rod for the sub-bundle. The center rod can then be used for carrying fuel. However, it can also be used as a tie rod in the form of a water-filled rod. In both cases, a desired symmetrical mechanical load can be achieved while utilizing one single rod in the sub-bundle. This center rod, whether it is fuel-carrying or water-filled, can also be advantageously used as a spacer holder rod.

BRIEF DESCRIPTION OF DRAWINGS

The invention will be explained in greater detail, by way of example, with reference to the accompanying drawings, wherein FIG. 3 shows a horizontal section taken through the line III—III in FIG. 1.

FIG. 4 shows a fuel rod in the fuel assembly in a vertical section, and

FIG. 5 shows the same fuel rod, on an enlarged scale, in a section perpendicular to the symmetry axis.

DESCRIPTION OF PREFERRED EMBODIMENT

Figure 1:
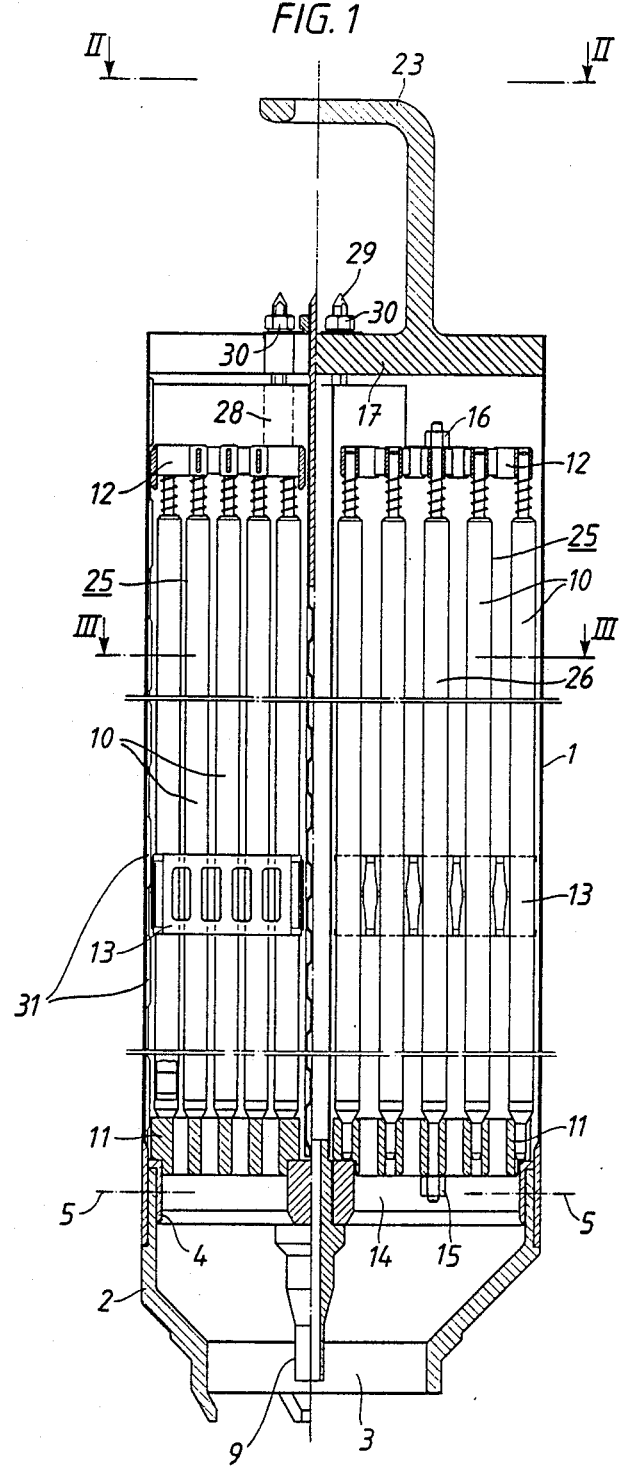
FIG. 1 shows an embodiment of a fuel assembly according to the invention in a vertical section taken through the line I—I in FIG. 2.
Figure 2:
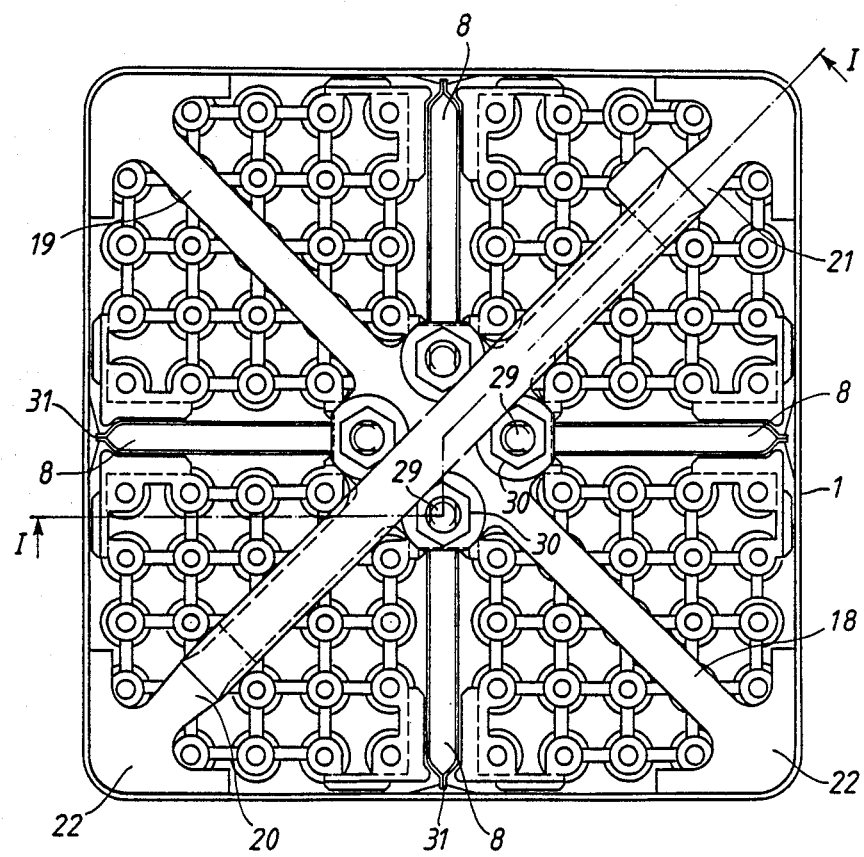
FIG. 2 shows the same fuel assembly in a plan view from above on the line II—II in FIG. 1.

In FIGS. 1 to 3, 1 designates a fuel channel of substantially square cross-section. The fuel channel 1 surrounds, with no significant play, an upper, square portion of a bottom part 2. The bottom part 2 has a circular, downwardly facing inlet opening 3 for cooling water and moderator water. In addition to supporting the fuel channel 1, the bottom part 2 carries a supporting plate 4. At its bottom end the fuel channel 1 has a relatively thick wall portion which is fixed to the bottom part 2 and the supporting plate 4 by means of a plurality of horizontal bolts, indicated by means of dash-dotted lines 5.

The fuel channel 1 is divided into four vertical sub-channels 6 by means of a hollow channel-forming member 7 of cruciform-section, which is welded to the four walls 1a, 1b, 1c and 1d of the fuel channel 1. The channel-forming member 7 defines four hollow wings 8. At its bottom end, the channel-forming member 7 is connected to an inlet tube 9 for moderator water. The sub-channels 6 each contain one sub-bundle 25 containing twenty-five fuel rods 10. The rods are arranged in a symmetrical lattice in five rows, each containing five rods. Each rod is included in two rows perpendicular to each other. The distance between this rod and the next adjacent rod is the same in each of the two rows. Each sub-bundle 25 is provided with a grid-like bottom tie plate 11, a grid-like top tie plate 12 and a plurality of spacers 13. The fuel channel 1, the channel-forming member 7 and the spacer 13 are all of a zirconium alloy, such as Zircaloy 4. The four bottom tie plates 11 are supported by the supporting plate 4 and are each partially inserted into a respective square hole 14 formed therein. In each sub-bundle 25 at least one of the fuel rods 10 is made with relatively longer, threaded end plugs, the lower end plug being passed through the bottom tie plate 11 and being clamped there with a nut 15, the upper end plug being passed through the top tie plate 12 and being clamped there with a nut 16. In the embodiment illustrated, it is the center fuel rod 26 which is formed in this way. This rod serves as a spacer holder rod for the sub-bundler 25.

An upper end portion of the fuel channel 1 surrounds a cruciform lifting plate 17 having four horizontal arms 18, 19, 20 and 21, which extend from a common central portion. At its outer end each arm has a portion 22 shaped generally into the form of an arrow-head. In each corner of the fuel channel 1, each of these shaped end portions 22 makes contact with the inner wall surface of a respective corner of the fuel channel 1. A lifting handle 23 is fixed to the arms 20 and 21. The lifting plate 17 and the lifting handle 23 together form a solid-cast lifting member of steel. The lifting plate 17 is fixed to the channel 7 by inserting each of four vertical bars 28 into a respective hollow wing 8 in the channel 7 and welding them thereto. At its upper end, each bar 28 has a vertical, bolt-like portion 29 which is passed, with play, through a corresponding holes in the central portion of the lifting plate 17 and provided with a nut 30. As will be clear from FIGS. 1 and 2, the fuel channel 1 is provided with indentations 31, spaced apart in the longitudinal direction, along an edge seam by which parts of the channel 7 are welded together.

The distance a (FIG. 3) between two fuel rods located adjacent to each other in the same row is, in the exemplified case, 3.0 mm. This distance a suitably lies in the range 2.4 mm to 3.9 mm. This applies to both of the rows which are perpendicular to each other and in which each fuel rod is included. The distance b between a fuel rod, located adjacent to a wall in the fuel channel 1, and said wall amounts to 2.8 mm, and this is also true of the distance c between a fuel rod, located adjacent to a wall in the channel for water, and said wall in the channel. The distance b and c suitably lie in the range 2.0 mm to 4.0 mm. The width d of that part 8 of the channel for water which is located between two adjacent sub-bundles 25 is, in the exemplified case, 6 mm. In practice d suitably lies in the range 3.0 mm to 8.0 mm.

As will be clear from FIGS. 4 and 5, each fuel rod 10 includes a cladding tube 41, which is a zirconium alloy, such as Zircaloy 2. The cladding tube 41 has a length of about four meters and in it about 300 circular-cylindrical pellets 42 are stacked one above the other in the axis direction of the tube. The pellets have a height of 11 mm and a diameter of 8.0 mm. The pellets 42 located nearest to each end of the fuel rods, consist of oxide of natural uranium while the other pellets consist, in a conventional manner, of uranium dioxide, which is enriched with respect to U 235. the bottom pellet 42 rests rigidly on a bottom end plug 43 welded to the lower end of the tube 41, and the top pellet is pressed downwards by a helical spring 44 which bears against a top end plug 45 welded to the upper end of the tube 41. The pellets 42 are ground so as to leave a clearance 46 between the envelope surface of the pellet and the inner wall of the cladding tube. In the exemplified case, the thickness of the cladding tube amounts to 0.6 mm and its outer diameter to 9.4 mm so that the clearance 46 has a width of $\frac{1}{2}[\{9.4-(2\times0.6)\}-8.0]=0.1$ mm. The pellets 46 desirably have a diameter in the range 7.4 mm to 8.8 mm and the diameter of the pellets is preferably 0.14 to 0.2 mm smaller than the inner diameter of the cladding tube that contains them.

The wall thickness of the cladding tube 41 lies in the range 0.5 to 0.7 mm and its outer diameter in the range 8.5 to 10.3 mm.

The fuel rod is filled with helium with a pressure of 4 MPa.

In the embodiment shown, instead of using a rod carrying fuel as the spacer holder rod, the center rod 26 may be formed as a water-filled tie rod and/or as a spacer holder rod. Also certain of the remaining rods in each sub-bundle may be formed as water-filled rods instead of as fuel rods.

The embodiment illustrated is capable of being modified in many respects within the scope of the following claims.

We claim:

1. In a nuclear fuel assembly for use in a boiling water reactor and which comprises a plurality of vertical rods, at least most said plurality of of vertical rods being fuel rods containing nuclear fuel, said vertical rods being surrounded by a fuel channel of substantially square cross-section and being divided by means of a vertical water flow channel of substantially cruciform cross-section into four sub-bundles of vertical rods, each fuel rod including a cladding tube of zirconium alloy and containing a stack of nuclear fuel pellets, the improvement wherein each of said four sub-bundles of vertical rods consists of twenty-five vertical rods arranged in a lattice of 5×5 rods, the cladding tube of each fuel rod in each sub-bundle having a wall thickness in the range of 0.5 to 0.7 mm and an outer diameter in the range 8.5 to 10.3 mm.

2. A nuclear fuel assembly according to claim 1, wherein the pellets of nuclear fuel each have a diameter in the range of 7.4 to 8.8 mm.

3. A nuclear fuel assembly according to claim 1, wherein the diameter of each pellet of nuclear fuel is 0.14 to 0.2 mm smaller than the inner diameter of the cladding tube which contains it.

4. A nuclear fuel assembly according to claim 2, wherein the diameter of each pellet of nuclear fuel is 0.14 to 0.2 mm smaller than the inner diameter of the cladding tube which contains it.

5. A nuclear fuel assembly according to claim 1, wherein the distance between the envelope surface of any two fuel rods located adjacent to each other in the same row in one sub-bundle lies in the range 2.4 to 3.9 mm.

6. A nuclear fuel assembly according to claim 2, wherein the distance between the envelope surface of any two fuel rods located adjacent to each other in the same row in one sub-bundle lies in the range 2.4 to 3.9 mm.

7. A nuclear fuel assembly according to claim 3, wherein the distance between the envelope surface of any two fuel rods located adjacent to each other in the same row in one sub-bundle lies in the range 2.4 to 3.9 mm.

8. A nuclear fuel assembly according to claim 4, wherein the distance between the envelope surface of any two fuel rods located adjacent to each other in the same row in one sub-bundle lies in the range 2.4 to 3.9 mm.

9. A nuclear fuel assembly according to claim 1, wherein the distance between a fuel rod located adjacent to a wall in the fuel channel and said wall, as well as the distance between a fuel rod located adjacent to a wall of the cruciform channel and said wall of the cruciform channel, lies in the range 2.0 to 4.0 mm.

10. A nuclear fuel assembly according to claim 8, wherein the distance between a fuel rod located adjacent to a wall in the fuel channel and said wall, as well as the distance between a fuel rod located adjacent to a wall of the cruciform channel and said wall of the cruciform channel, lies in the range 2.0 to 4.0 mm.

11. A nuclear fuel assembly according to claim 1, wherein the width of that part of the channel having cruciform cross-section which is located between two adjacent sub-bundles lies in the range 3.0 to 8.0 mm.

12. A nuclear fuel assembly according to claim 10, wherein the width of that part of the channel having cruciform cross-section which is located between two adjacent sub-bundles lies in the range 3.0 to 8.0 mm.

13. A nuclear fuel assembly according to claim 1, wherein at least some of the fuel rods are provided at their ends with pellets of oxide of natural uranium.

14. A nuclear fuel assembly according to claim 1, wherein the vertical rod which is located at the center of each sub-bundle is utilized as a tie rod in the sub-bundle and is clamped to top and bottom tie plates of the sub-bundle.

15. A nuclear fuel assembly according to claim 14, wherein the vertical rod which is located at the center of each sub-bundle is utilized as a support for holding rod spacing means within the sub-bundle between the top and bottom tie plates.

* * * * *